UNITED STATES PATENT OFFICE.

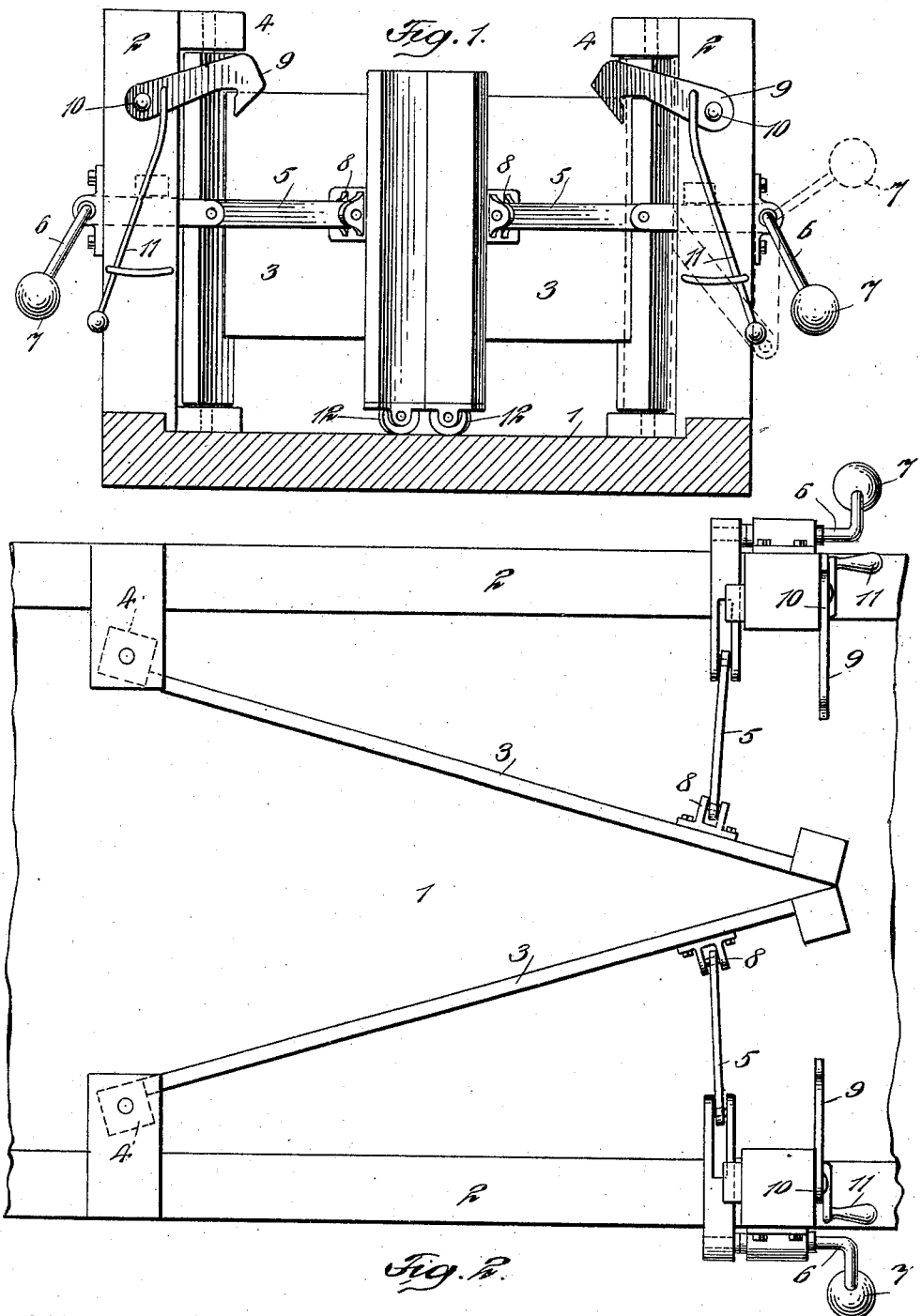

JOHN JONES, OF NEW YORK, N. Y.

SAFETY-GATE.

986,574.　　　　　Specification of Letters Patent.　　Patented Mar. 14, 1911.

Application filed September 15, 1910. Serial No. 582,267.

*To all whom it may concern:*

Be it known that I, JOHN JONES, a citizen of the United States, residing at New York, in the county of New York and State of New York, have invented certain new and useful Improvements in Safety-Gates; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates especially to gates employed for stopping runaway horses, automobiles, or other bodies, in roadways of all descriptions, and has for its object the provision of a gate of this character which will not only effectually stop the running horse or team, but without danger of killing such horse or team, and avoiding serious injury.

To attain the desired end, my invention consists essentially in a gate adapted and arranged to form a wedge-shaped pocket, when closed; and my invention also involves certain novel and useful combinations or arrangements of parts, and peculiarities of construction and operation, all of which will be hereinafter first fully described, and then pointed out in the claims.

In the drawing Figure 1 is an end elevation of my gate, looking from the right of Fig. 2. Fig. 2 is a plan view of my gate and a piece of roadway wherewith it is employed.

Similar numerals of reference, wherever they occur, indicate corresponding parts in both figures.

1 is a roadway.

2 are side walls or fences.

3, 3 are the two portions of my gate, hinged to the walls at 4.

5 are jointed bars, one end of each being secured to a shaft 6, provided with a weight 7, the other end of the jointed bar being pivoted to a bracket 8, upon a part 3 of the gate.

9 is a hook, pivoted at 10, and provided with an operating crank 11.

When the gate is open the jointed bar folds together, and the hook 9 passes over the top rail of the gate, holding the gate against movement.

12 is a bearing wheel in the end bar of the gate.

When the gate is open, and the jointed bars folded together, the weight 7 is raised, as indicated in dotted lines. If necessity arises for closing the gate, by moving the crank 11 toward the gate, the hook 9 is raised, releasing the gate, and the falling of the weights 7 to the positions shown in Fig. 1 of the drawing, forces the gate inward and straightens out the jointed bar, locking the gate closed, all of these movements requiring but a moment to complete.

I have shown the gate as made in two parts in the present instance, but it is obvious that a single part might be used, passing diagonally across the roadway, or arranged in any other manner, so as to form a wedge-shaped pocket, without departing from the spirit of my invention. The result of my arrangement is that a horse or team running into the pocket are not abruptly brought to a standstill, or thrown down, but the stopping is comparatively gradual, and the animal or animals wedged into the pocket, and cannot fall down or be seriously injured, as would be the case if the gate extended across the roadway at a right angle, and any vehicle to which the animal was attached would be also brought to a standstill without an abrupt shock, thus avoiding injury to the vehicle and its occupants, and this would be equally true if the vehicle be an automobile, or any other body beyond control.

Having now fully described my invention, what I claim as new therein, and desire to secure by Letters Patent, is:

1. In combination with two gates, an object to which the same are pivoted at corresponding ends, a rock shaft journaled in suitable bearings in said object, each rock shaft angled and having a weight secured thereto, pivotal link connections between said rock shaft and each gate, hooks pivotally mounted upon said object and adapted to hold the gates open, a handle fastened to each hook, and means for holding each handle in an adjusted position.

2. In combination with vertical fence walls having laterally projecting portions, gates pivotally mounted in the latter, caster wheels upon which the free swinging ends of the gates are mounted, rock shafts journaled in suitable bearings upon said walls and each rock shaft having an angled end and a weight thereon, pivotal link connections between one rock shaft and gate, hooks pivotally mounted upon the wall, a handle fastened to each hook, and a loop adapted to engage a handle and hold the same in adjusted position, each hook adapted to engage over the upper edge of the gate to hold the same open.

In testimony whereof I hereunto affix my signature in the presence of two witnesses.

JOHN JONES.

Witnesses:
ANTONY W. VISCO,
CHAS. A. CONNER.

Copies of this patent may be obtained for five cents each, by addressing the "Commissioner of Patents, Washington, D. C."